United States Patent [19]

Kasahara et al.

[11] Patent Number: 4,748,208
[45] Date of Patent: May 31, 1988

[54] CURABLE ELASTOMER COMPOSITION

[75] Inventors: Michio Kasahara, Kawasaki; Hideaki Kodera, Fuji, both of Japan

[73] Assignee: Asahi Kasei Kogyo Kabushiki Kaisha, Osaka, Japan

[21] Appl. No.: 60,995

[22] Filed: Jun. 5, 1987

Related U.S. Application Data

[63] Continuation of Ser. No. 791,123, Oct. 24, 1985, abandoned.

[30] Foreign Application Priority Data

Nov. 22, 1984 [JP] Japan .................. 59-247578
Feb. 25, 1985 [JP] Japan .................. 60-34483

[51] Int. Cl.⁴ .................................................. C08F 8/40
[52] U.S. Cl. .................................. 525/151; 525/150; 525/326.4; 525/340
[58] Field of Search ............... 525/150, 151, 340

[56] References Cited

U.S. PATENT DOCUMENTS

| | | | |
|---|---|---|---|
| 2,968,649 | 1/1961 | Pailthorp et al. | 260/80.5 |
| 3,051,677 | 4/1957 | Rexford | 260/29.6 |
| 3,235,537 | 2/1966 | Albin et al. | 260/80.5 |
| 3,318,854 | 5/1967 | Honn | 260/87.7 |
| 3,655,727 | 1/1970 | Patel et al. | 260/470 P |
| 3,857,807 | 12/1974 | Kometani | 260/29.6 F |
| 3,876,654 | 4/1975 | Pattison | 260/30.4 R |
| 4,259,463 | 3/1981 | Moggi et al. | 525/331 |
| 4,287,320 | 9/1981 | Kolb | 525/340 |
| 4,407,824 | 10/1983 | Eckert | 424/329 |
| 4,501,858 | 2/1985 | Moggi | 525/340 |

OTHER PUBLICATIONS

*Hackh's Chemical Dictionary*, 4th Edition, J. Grant, ed., McGraw-Hill Book Company, N.Y., p. 92.

Primary Examiner—Joseph L. Schofer
Assistant Examiner—Bernard Lipman
Attorney, Agent, or Firm—Birch, Stewart, Kolasch & Birch

[57] ABSTRACT

A curable fluoroelastomer composition comprising:
 (a) a fluoroelastomeric copolymer of vinylidene fluoride and at least one other fluorinated monomer;
 (b) a curing accelerator comprising an iminum compound of the formula

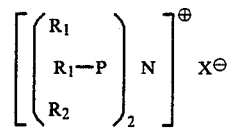

wherein $R_1$ is a substituted or unsubstituted aryl group, $R_2$ is an alkyl or halogenated alkyl group, a cycloalkyl or halogenated cycloalkyl group, or a substituted or unsubstituted aralkyl group, and X is a halogen atom;
 (c) a polyhydroxy compound as a cross-linking agent; and
 (d) a metal compound selected from a divalent metal hydroxide, a divalent metal oxide or a mixture thereof.

13 Claims, No Drawings

CURABLE ELASTOMER COMPOSITION

This application is a continuation of application Ser. No. 791,123, filed on Oct. 24, 1985, now abandoned.

BACKGROUND OF THE INVENTION

This invention relates to a vinylidene fluoride elastomer composition containing a specific iminium compound as a curing accelerator.

Vinylidene fluoride cured elastomers (fluoro rubber) have been used for various purposes such as O-rings, gaskets, diaphragms, hoses, sheets, rools and the like, and the demand for these elastomers has recently increased more and more.

There have been proposed many kinds of vinylidene fluoride elastomer compositions containing a polyhydroxy aromatic compound as a curing or cross-linking agent to improve compression set and scorch resistance properties. The improvement of these properties has been studied mainly from the view point of development of a curing accelerator to be used together with the polyhydroxy aromatic compound being a curing agent. For example, U.S. Pat. Nos. 3,655,727 and 3,876,654 teach the use of a quaternary phosphonium compound as a curing accelerator. U.S. Pat. No. 3,655,727 also teaches the quaternary ammonium compound. The specific quaternary ammonium compound of 8-alkyl- or 8-aralkyl-1,8-diaza-bicyclo[5,4,0]-7-undecenium and the amino phosphinic derivatives are disclosed in U.S. Pat. Nos. 3,857,807 and 4,259,463, respectively. In addition, the Bis(triarylphosphin)iminum compound was recently reported in European Patent Application No. 841031 26.3 (EPO 0120462 AI).

However, the values of compression set, especially at high temperatures, of the rubbers obtained from these fluoroelastomer compositions do not reach adequately satisfactory levels. Further, when the rate of curing is retarded by a reduction in the amount of the curing accelerator to prepare complicated or thick-gauge articles, adhesion of the cured elastomer to a mold occurs which induces the appearance of defects in the articles and contamination of the mold.

In the case of a composition employing the quaternary ammonium compound, in addition to the above problems, there are some other problems, which are induced by hygroscopic and deliquescent properties. These problems include the necessity of the troublesome consideration for safety storage of the composition and a decrease in the curing property as well as various properties of the obtained cured elastomer.

In the case of the Bis(triarylphosphin)iminum compound, as shown in the EXAMPLES hereinafter, the cured elastomer obtained shows a higher compression set, especially at a higher temperature, low elongation and large variations of strain property in the thermal aging test.

SUMMARY OF THE INVENTION

The object of the present invention is to provide a novel vinylidene fluoride elastomer composition having excellent curing properties, processability, storability and mold releasing as well as compression set without losing the good thermal, oil and chemical resistance shown by the conventional compositions.

The present invention is directed to a curable fluoroelastomer composition comprising:

(a) a fluoroelastomeric copolymer of vinylidene fluoride and at least one other fluorinated monomer, (b) as a curing accelerator, an iminium compound represented by the general formula (1);

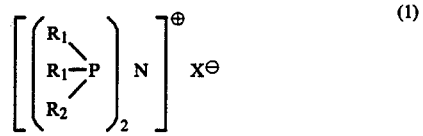

wherein $R_1$ is an aryl group or a substituted aryl group substituted by at least one group selected from an alkyl group having 1 to 20 carbon atoms, an alkoxy group having 1 to 20 carbon atoms, a cycloalkyl group having 3 to 8 carbon atoms, a cyano group, a group of the formula

(wherein $R_3$ and $R_4$, are the same or different, and are $C_1$-$C_{20}$ alkyl groups, $C_3$-$C_8$ cycloalkyl groups or phenyl groups) and a halogen atom, $R_2$ is an alkyl or halogenated alkyl group having 1 to 20 carbon atoms, a cycloalkyl or halogenated cycloalkyl group having 3 to 8 carbon atoms, an aralkyl group having 7 to 20 carbon atoms, or a substituted aralkyl group having an aralkyl skeleton of 7 to 20 carbon atoms in which at least one hydrogen atom of the aryl part is substituted by at least one member selected from a $C_1$-$C_{20}$ alkyl group, a $C_3$-$C_8$ cycloalkyl group, a $C_1$-$C_{20}$ alkoxy group, a phenyl group, a cyanogroup, a group of the formula

(wherein $R_3$ and $R_4$, the same or different, are $C_1$-$C_{20}$ alkyl, $C_3$-$C_8$ cycloalkyl or phenyl groups) and a halogen atom X is halogen, hydroxyl, sulfate, thiosulfate, nitrate, formate, acetate, cyanate, thiocyanate, tetraphenylborate, 2-mercaptobenzothiazolate, or perchlorate ion, (c) a polyhydroxy compound as a cross-linking agent, and (d) a metal compound selected from a divalent metal hydroxide, a divalent metal oxide or a mixture thereof.

DESCRIPTION OF PREFERRED EMBODIMENT

As illustrated above, the primary characteristic of the present invention resides in that the special iminum compound (b) represented by the general formula (1) is employed as a curing accelerator. The cured elastomer of the present invention is more excellent in compression set, elongation and strain properties than the cured elastomer obtained from a Bis(triarylphosphine)iminum compound.

Among the iminum compounds (b) shown by the formula (1), preferred compounds have an unsubstituted or substituted phenyl group as $R_1$. An unsubstituted phenyl group is more preferable. A more preferable substituent of the substituted phenyl group among the substituents described above, is an alkyl or alkoxy group having 1 to 4 carbon atoms.

Preferable groups of $R_2$ are an alkyl group having 1 to 20 carbon atoms, more preferably 1 to 10 carbon atoms, a cycloalkyl group having 3 to 8 carbon atoms, more preferably 3 to 6 carbon atoms, an aralkyl group having 7 to 20 carbon atoms and a substituted aralkyl group having a $C_7$-$C_{20}$ aralkyl skeleton. Preferable substituents of the substituted aralkyl group are an alkyl or alkoxy group having 1 to 4 carbon atoms, a phenyl group and halogen which are bonded to a phenyl part of the aralkyl group. A benzyl group is the most preferable group.

In the general formula (1), as will be understood by a person skilled in the art, the charge of X is not limited to mono valence, and therefore, means mono and poly valence.

Representative compounds (b) are described hereinafter in accordance with each of the preferable groups of $R_1$ and $R_2$.

(1) Bis(methyldiphenylphosphine)iminum chloride and tetraphenylborate, Bis[methyldi(4-methylphenyl)phosphine]-iminum chloride, Bis[methyldi(4-butylphenyl)phosphine]-iminum chloride, Bis(butyldiphenylphosphine)iminum bromide, Bis(dodecyldiphenylphosphine)iminum chloride, Bis(tetradecyldiphenylphosphine)iminum chloride, Bis(hexadecyldiphenylphosphine)iminum chloride and Bis(octadecyldiphenylphosphine)iminum chloride.

(2) Bis[methyldi(4-metoxyphenyl)phosphine]iminum chloride.

(3) Bis(cyclohexyldiphenylphosphine)iminum chloride (4) Bis[benzyldiphenylphosphine]iminum chloride, bromide and acetate, Bis[benzyldi(4-methylphenyl)phosphine]iminum chloride, Bis(2-methylbenzyldiphenylphosphine)iminum chloride, Bis(3-methylbenzyldiphenylphosphine)iminum chloride, Bis(4-methylbenzyldiphenylphosphine)iminum chloride, Bis(4-methylbenzyldi(4-methylphenyl)phosphine]iminum chloride, Bis(2,4-dimethylbenzyldiphenylphosphine)iminum chloride, Bis(4-tertbutylbenzyldiphenylphosphine)iminum chloride, Bis(4-methoxybenzyldiphenylphosphine)iminum chloride, Bis(4-ethoxybenzyldiphenylphosphine)iminum chloride, Bis(4-phenylbenzyldiphenylphosphine)iminum chloride, Bis(4-fluorobenzyldiphenylphosphine)iminum chloride, Bis(4-chlorobenzyldiphenylphosphine)iminum chloride, Bis(4-bromobenzyldiphenylphosphine)iminum chloride, Bis(phenethyldiphenylphosphine)iminum chloride, Bis(diphenylmethyldiphenylphosphine)iminum chloride and Bis(triethyldiphenylphosphine)iminum chloride.

(5) Bis[benzyldi(4-metoxyphenyl)phosphine]iminum chloride and Bis[4-methylbenzyldi(4-metoxyphenyl)phosphine]iminum chloride.

Among these compounds, Bis(benzyldiphenylphosphine)iminum chloride is the most preferable.

The iminum compound (b) is prepared by a similar method described in [Zeitschrift fur Anorganishe und Allgemeine Chmie, 492 122 134 (1982)]. If it is necessary to exchange an anion X of the iminum compound (b) from one to another, it may be done by the method described in Acta Chemica Scandinavia, A31 645 (1977) or the usual anion exchange method employing an anion exchange resin.

The following are reaction formulae of the representative compounds;

Bis(methyldiphenylphosphine)iminum chloride

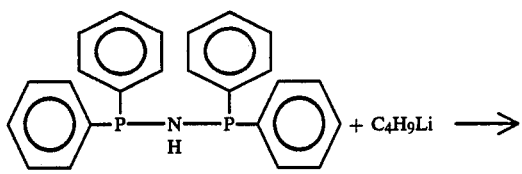

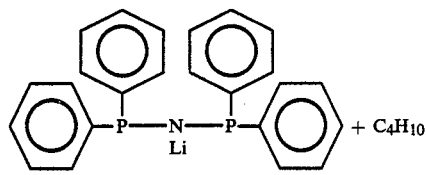

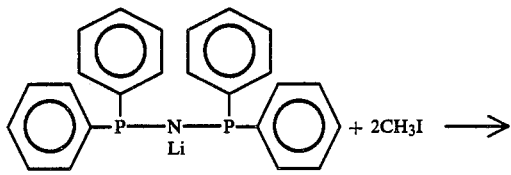

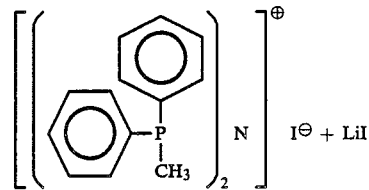

The obtained iminum iodide is converted to the iminum chloride by an anion exchange resin of the chloride type.

Bis(benzyldiphenylphosphine)iminum chloride

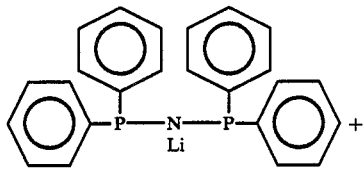

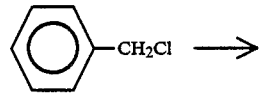

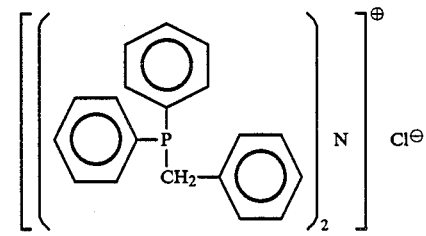

+LiCl

Bis(benzyldi(4-methylphenyl)phosphine)iminum chloride

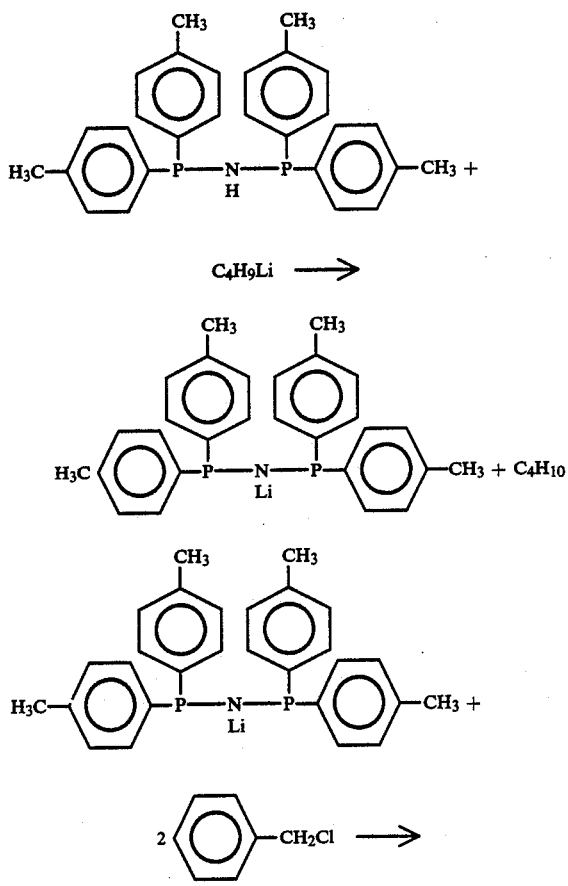

Bis(4-chlorobenzyldiphenylphosphine)iminum chloride

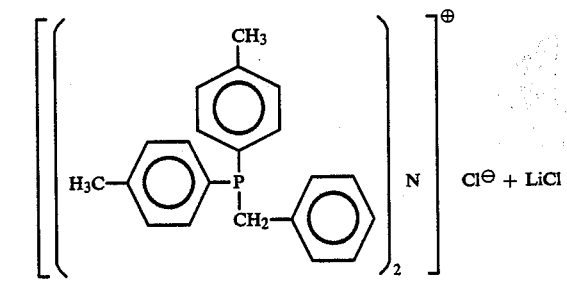

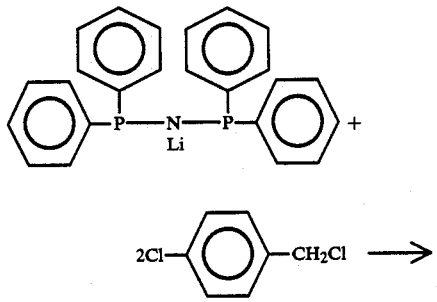

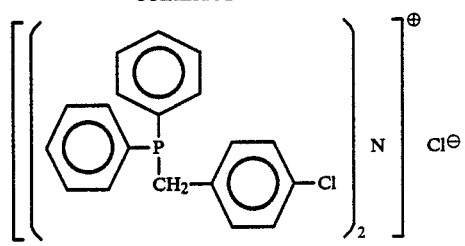

+LiCl

According to the invention present, the iminum compound (b) can also be used together with a specific sulfone compound (e) represented by the following formula (2) as an additional curing accelerator of the present fluoroelastomer composition. The fluoroelastomer composition obtained utilizing this additional curing accelerator exhibits good processability properties, such as shortened mold time without loss of other properties. Good processability is especially important in the case of molding thick-gauge articles. The sulfone compound (e) is represented by the general formula (2):

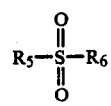 (2)

wherein $R_5$ and $R_6$, are the same or different, and are substituted or unsubstituted alkyl groups having 1 to 20 carbon atoms, substituted or unsubstituted cycloalkyl groups having 3 to 8 carbon atoms, substituted or unsubstituted cycloalkenyl groups having 4 to 12 carbon atoms, substituted or unsubstituted aralkyl groups having 7 to 20 carbon atoms and substituted or unsubstituted phenyl groups.

Although these compounds are broadly proposed in U.S. Pat. No. 4,287,320, preferable compounds for use according to the present invention are the following:

Those wherein $R_5$ and $R_6$, are the same or different, and may be a $C_1$-$C_8$ alkyl, a $C_1$-$C_8$ substituted alkyl substituted by a halogen atom, a cyano group or an isocyano group, a $C_3$-$C_8$ cycloalkyl, a $C_3$-$C_8$ halogenated cycloalkyl, phenyl, a substituted phenyl substituted by halogen or a $C_1$-$C_4$ alkyl group, a $C_7$-$C_{11}$ aralkyl, a $C_7$-$C_{11}$ aralkyl having a substituent of halogen or a $C_1$-$C_4$ alkyl group, cycloalkenyl, vinyl and allyl. Among these groups, most preferable is a substituted or unsubstituted alkyl group having 1 to 8 carbon atoms.

Representative compounds are the following:
Dimethylsulfone, Diethylsulfone, Di-n-butyl-sulfone, Di-n-octylsulfone, Bis(2-chloroethyl)sulfone, Ethylpropylsulfone, Tetramethylenesulfone, 3,4-Dibromotetramethylenesulfone, 3-methylsulfolane, 2,4-dimethylsulfolane, Di-cyclo-hexylsulfone, Diphenylsulfone, Bis(4-fluorophenyl)sulfone, Bis(4-chlorophenyl)sulfone, Bis(4-bromophenyl)sulfone, Bis(4-methylphenyl)sulfone, Dibenzothiphenesulfone, Phenyl-4-methylphenylsulfone, Dibenzylsulfone, Bis(4-methylbenzyl)sulfone, Bis(4-chlorobenzyl)sulfone, Benzyl-4-methylbenzylsulfone, Butadienesulfone, 3-Ethyl-2,5-dihydrothiophene-1,1-dioxide, Methylphenylsulfone, Ethylphenylsulfone, Bis-(phenylsulphonyl)methane, 1,2-Bis(phenylsulphonyl)ethane, 2-Chloroethyl-4-chlorophenylsulfone, Methyl-4-methylphenyl-sulfone, 2-Chloroethyl-4-chlorophenylsulfone, Methyl-4-methyl-phenylsulfone, 2-Chloroethyl-4-methylphenylsulfone, 4-Methylphenylsulfonylacetonitrile, 4-Methylphenyl-sulfonylmethylisocyanide, Benzylmethylsulfone, Benzyl-2-chloroethylsulfone, 4-Methylbenzylmethylsulfone, Benzyl-phenylsulfone, Benzyl-4-methylphenylsulfone, Benzyl-4-chlorophenylsulfone, 4-Methylbenzylphenylsulfone, 4-Chlorobenzylphenylsulfone, 4-Methylbenzyl-4-methylphenylsulfone, phenylvinyl-sulfone, Allylphenylsulfone, 4-Methylphenylvinylsulfone, Allyl-4-chloro-phenylsulfone.

Among these sulfone compounds, dimethylsulfone is the most preferable.

The fluoroelastomer copolymer, the component (a), of the present invention means a copolymer of vinylidene fluoride and at least one other fluorinated monomer. The other fluorinated monomers may be, for example, hexafluoropropene, 1,2,3,3-pentafluoropropene, 3,3,3-trifluoropropene, tetrafluoroethylene, trifluoroethylene, 1,2-difluoroethylene, dichlorodifluoroethylene, chlorotrifluoroethylene, hexafluorobutene, a fluorinated vinylether, a fluorinated alkyl vinylether and a perfluoro acrylic acid ester. Among these, preferable monomers are hexafluoropropene, pentafluoropropene and tetrafluoroethylene.

These copolymers are per se known in the art as illustrated below and some of these are also available. A copolymer of vinylidene fluoride and hexafluoropropene is disclosed in U.S. Pat. Nos. 3,051,677, 3,235,537 and 3,318,854 and Japanese Patent Publication No. 7398/1958. A terpolymer of vinylidene fluoride, hexafluoropropene and tetrafluoroethylene is disclosed in U.S. Pat. No. 2,968,649. U.S. Pat. No. 3,801,552 teaches a copolymer of vinylidene fluoride and hexafluoropropane and a terpolymer of vinylidene fluoride, hexafluoropropene and tetrafluoroethylene prepared by the method of radical suspension polymerization. Copolymers of vinylidene fluoride and another fluorinated monomer such as a fluorinated vinylether and 1,2,3,3-pentafluoropropene are disclosed in U.S. Pat. Nos. 3,136,745, 3,331,823 and 3,335,106.

The component (c), a polyhydroxy compound, employed in the present invention as a cross-linking agent is also per se well known. A preferable compound is selected from a polyhydroxy aromatic or a fluorinated polyhydroxy aliphatic compound. Examples of the polyhydroxy aromatic compound or Bisphenol A, Bisphenol AF, resorcinol, 1,3,5-trihydroxybenzene, 1,7-, 2,7- or 1,6-dihydroxynaphthalene, 4,4'-dihydroxydiphenyl, 4,4'-di-hydroxystilbene, 2,6-dihydroxyanthracene, hydroquinone, catechol, 2,2-bis(4-hydroxyphenyl)butane, 4,4-bis(4-hydroxyphenyl)pentanoic acid, 2,2-bis(4-hydroxyphenyl)-tetrafluorodichloropropane, 4,4'-dihydroxydiphenylsulfone, 4,4'-dihydroxydiphenylketone, tri(4-hydroxyphenyl)metane, 3,3',5,5'-tetrachlorobisphenol A and 3,3',5,5'-tetrabromobisphenol A. Examples of the fluoronated polyhydroxy aliphatic compound, are CF$_2$(CF$_2$CH$_2$OH)$_2$,
HOCH$_2$(CF$_2$)$_4$—OCF(CF$_3$)CH$_2$OH,
HOCH$_2$(CF$_2$)$_2$OCF(CF$_3$)CH$_2$OH,
CF$_2$(CFHCF$_2$CH$_2$OH)$_2$,
(CF$_2$)$_3$(CF$_2$CH$_2$OH)$_2$,
(CF$_2$)$_3$(CFHCF$_2$CH$_2$OH)$_2$,
(CF$_2$)$_5$(CF$_2$CH$_2$OH)$_2$ and
(CF$_2$)$_5$(CFHCF$_2$CH$_2$OH)$_2$.

Among thse, Bisphenol AF and hydroquinone are more preferable. Alkali and alkali earth metal salts of these compounds may also be employed.

The polyhydroxy compound (c) may be also employed as a mixture of the individual compounds described above.

The component (d) is also per se known and employed in the art. A preferable compound of a divalent metal oxide or hydroxide may be, for example, an oxide or hydroxide of magnesium, zinc, calcium and lead, and may be employed together with 1 to 70 weight % of a metal salt of a weak acid. The metal salt may be a stearate, benzoate, carbonate, oxalate or phosphite of a metal such as barium, sodium, potassium, lead and calcium.

In the composition of the present invention, relating to the amount of the above components to 100 parts by weight of the fluoroelastomeric copolymer (a), 0.05 to 2.0 parts, preferably 0.1 to 1.0 parts of the iminum compound (b), 0.1 to 10 parts, preferably 0.6 to 5.0 parts of the polyhydroxy compound (c) and 1 to 30 parts, preferably 2 to 20 parts of the metal compound (d) are suitably employed. The sulfone compound (e) is employed in the range of 0.05 to 10 parts, preferably 0.1 to 5.0 parts to 100 parts of the component (a).

In the present invention, a reinforcing agent, plasticizer, colorant and filler such as carbon black, silica, clay, diatomaceous earth or talc may be added to the composition of the present invention. Moreover one or more conventional curing agents or accelerators may also be added, if desired.

Components (b), (c) and (d) can be mixed with the fluoroelastomer (a) by means of any mixing apparatus known to be useful for preparing fluoroelastomer compositions. In this manner, a master batch of the fluoroelastomer (a) and one or more components (b), (c) and (d) may be applied.

The thus obtained fluoroelastomer compositions are cured by a conventional process. For instance, the composition is milled by a roll-type rubber mill or a Banbury mixer, is put into a mold and is cured under pressure followed by a post-curing operation. In general, the press (initial) cure is carried out at 100° to 200° C., for 3 to 180 minutes and under 20 to 100 kg/cm$^2$, and the post-curing operation is carried out at 150° to 300° C. and for 0 to 30 hours.

Other processes which may be carried out for curing include a process in which the curing is carried out after pre-molding or extrusion molding; a process in which a coating composition prepared by dissolving or dispersing the fluoroelastomer composition into a solvent such as ketones, e.g. methylethylketone, acetone, and cyclohexanone, ethers, eg. methylethylether, diethylether, dioxane and tetrahydrofurane, or a mixture thereof is applied on a surface of paper, fiber, film, sheet, board, tube, pipe, tank, big vessel or other shaped articles and then cured.

The present invention will now be further described by means of specific examples which are not intended to be limitive of the scope of the invention.

Reference Example: Preparation of Bis(benzyldiphenylphosphine)iminum chloride

To a solution of 3.15 mmol of [(C$_6$H$_5$)$_2$P]$_2$NH in 30 ml of benzene, is added 3.15 mmol of a butyl lithium-hexane solution diluted by 10 ml of benzene, and the reaction is conducted under reflux for one hour. After the resultant mixture is allowed to cool, a white precipitate is produced by the addition of 6.30 ml of benzylchloride. The solvent is removed by distillation, and the obtained residue is mixed with 35 ml of ethylether followed by reflux under boiling temperature. A white precipitate is filtered and washed two times by 15 ml of ethylether. The precipitate is dissolved into 15 ml of ethanol. The white crystal of Bis(benzyldiphenylphosphine)iminum chloride is produced by the addition of 10 ml of petroleum ether to the ethanol solution. The white crystal is filtered and dried under $10^{-8}$ torr of vacuum for one night. The yield is 70%. The crystal has a melting point of 255° C., shows good stability in air and is not hygroscopic and deliquesent.

EXAMPLE 1

One hundred parts by weight of a fluoroelastomeric copolymer Viton E-60 (trade name of E.I. duPont de Nemours & Company, and concerning the copolymers of vinylidene fluoride and hexafluoropropene, having a Mooney $ML_{1+10}$ (100° C.=60), is milled on a 2-roll mill, while adding 30 parts by weight of M.T. Carbon black, 6 parts by weight of calcium hydroxide, 3 parts by weight of magnesium oxide, Kyowamag #150 (sold from Kyowa Chemical Ind. Co., Ltd., Japan), 2.0 parts by weight of Bisphenol AF and 0.34 parts by weight of Bis(methyldiphenylphosphine)iminum chloride prepared by the method described above in the Reference Example, and the resultant composition is allowed to stand over one night. After milling again, the composition is put into a mold and press-cured at 177° C. for 10 minutes to give a sheet and O-ring. The resultant article is removed from the mold and post-cured at 232° C. for 24 hours in an oven in which a blower circulates the air.

The shore hardness (JIS-A), modulus, tensile and elongation values are obtained by JIS K6301. Compression set values are obtained by ASTM D396-61 Method B, using the O-ring having an inside diameter of 23.5 mm and a thickness of 3.5 mm as a test sample, under the conditions of 200° C., a compression of 25% and for 72 hours. A curing test is carried out by using an Oscillating Disc Rheometer (Toyo Seiki Seisaku-sho, Ltd., Japan) under the conditions of 177° C., frequency of 3 cpm and amplitude of 3°.

The results are shown in Table 2.

EXAMPLE 2

The same procedure as in Example 1 is repeated except that 0.45 parts by weight of Bis(benzyldiphenylphosphine)iminum chloride is employed instead of 0.34 parts by weight of Bis(methyldiphenylphosphine)iminum chloride. The results are shown in Table 2.

EXAMPLE 3

The same procedure as in Example 1 is repeated except that a fluoroelastomeric terpolymer Viton B (trade name of E. I. duPont de Nemours & Company, and concerning the terpolymer of vinylidene fluoride, hexafluoropropene and tetrafluoroethylene, having a Mooney $ML_{1+10}$ (100° C.)=75) and 0.90 parts by weight of Bis(benzyldiphenylphosphine)iminum chloride are employed instead of Viton E-60 and 0.34 parts by weight of Bis(methyldiphenylphosphine)iminum chloride, respectively.

The results are shown in Table 2.

EXAMPLES 4 TO 7 AND COMPARATIVE EXAMPLES 1, 3 AND 4

The same procedure as in Example 1 is repeated except that instead of the iminum compound of Example 1 the following are employed: Bis[benzyldi(4-methoxyphenyl)phosphine]iminum chloride (Example 4), Bis(2,4-dimethylbenzyldiphenylphosphine)iminum chloride (Example 5), Bis(methyldiphenylphosphine)iminum tetraborate (Example 6), Bis(benzyldiphenylphosphine)iminum acetate (Example 7) and Bis(triphenylphosphine)iminum chloride, bromide and iodide (Comparative Examples 1, 3 and 4, respectively). The results are shown in Table 2.

COMPARATIVE EXAMPLE 2

The same procedure as in Example 3 is repeated except that Bis(triphenylphosphine)iminum chloride is employed instead of Bis(benzyldiphenylphosphine)iminum chloride. The results are shown in Table 2.

As shown in Examples 1 to 7 and Comparative Examples 1 to 4, the present composition exhibits excellent elongation and a significant advance in the compression set values in comparison with the known composition containing a Bis(triallylphosphine)iminum salt.

TABLE 1

| Component (part by weight) | (Composition) Examples | | | | | | | Comp. Examples | | | |
|---|---|---|---|---|---|---|---|---|---|---|---|
| | 1 | 2 | 3 | 4 | 5 | 6 | 7 | 1 | 2 | 3 | 4 |
| Viton E-60 | 100 | 100 | | 100 | 100 | 100 | 100 | 100 | | 100 | 100 |
| Viton B | | | 100 | | | | | | 100 | | |
| M.T. carbon black | 30 | 30 | 30 | 30 | 30 | 30 | 30 | 30 | 30 | 30 | 30 |
| Calcium hydroxide | 6 | 6 | 6 | 6 | 6 | 6 | 6 | 6 | 6 | 6 | 6 |
| Magnesium oxide | 3 | 3 | 3 | 3 | 3 | 3 | 3 | 3 | 3 | 3 | 3 |
| Bisphenol AF | 2.0 | 2.0 | 2.0 | 2.0 | 2.0 | 2.0 | 2.0 | 2.0 | 2.0 | 2.0 | 2.0 |
| Bis(methyldiphenylphosphine) iminum chloride | 0.34 | | | | | | | | | | |
| Bis(benzyldiphenylphosphine) iminum chloride | | 0.45 | 0.90 | | | | | | | | |
| Bis[benzyldi(4-methoxy phenyl)] phosphine iminum chloride | | | | 0.54 | | | | | | | |
| Bis-(2.4-dimethylbenzyldiphenyl phosphine) iminum chloride | | | | | 0.47 | | | | | | |
| Bis(methyldiphenylphosphine) iminum tetraborate | | | | | | 0.55 | | | | | |
| Bis(benzyldiphenylphosphine) iminum acetate | | | | | | | 0.45 | | | | |
| Bis(triphenylphosphine) iminum chloride | | | | | | | | 0.43 | 0.86 | | |
| Bis(triphenylphosphine) iminum bromide | | | | | | | | | | 0.46 | |
| Bis(triphenylphosphine) | | | | | | | | | | | 0.50 |

TABLE 1-continued

| Component (part by weight) | (Composition) Examples | | | | | | | Comp. Examples | | | |
|---|---|---|---|---|---|---|---|---|---|---|---|
| | 1 | 2 | 3 | 4 | 5 | 6 | 7 | 1 | 2 | 3 | 4 |
| iminum iodide | | | | | | | | | | | |

TABLE 2

| | Examples | | | | | | | Comp. Examples | | | |
|---|---|---|---|---|---|---|---|---|---|---|---|
| | 1 | 2 | 3 | 4 | 5 | 6 | 7 | 1 | 2 | 3 | 4* |
| Rheometer (177° C.) | | | | | | | | | | | |
| Minimum viscosity (torque) | 2.3 | 2.4 | 5.3 | 2.5 | 2.3 | 2.2 | 2.4 | 2.8 | 6.1 | 2.8 | 2.3 |
| Cure rate (torque) | 45.8 | 43.5 | 43.5 | 44.4 | 41.1 | 44.1 | 43.0 | 46.8 | 44.7 | 44.6 | 43.7 |
| Scorch time (min.) | 5.9 | 5.9 | 7.2 | 6.1 | 5.2 | 7.3 | 5.4 | 5.1 | 5.7 | 6.0 | 8.8 |
| Proper curing time (min.) | 8.3 | 8.4 | 10.4 | 8.0 | 7.6 | 9.2 | 7.2 | 6.9 | 8.3 | 8.9 | 13.0 |
| Tensile Properties | | | | | | | | | | | |
| Shore hardness, JIS-A | 75 | 73 | 77 | 74 | 74 | 74 | 72 | 77 | 80 | 75 | 76 |
| Modulus at 100% elongn. (kgf/cm$^2$) | 65 | 53 | 69 | 54 | 52 | 68 | 51 | 66 | 77 | 68 | 66 |
| Tensile strength (kgf/cm$^2$) | 176 | 169 | 176 | 158 | 171 | 166 | 169 | 161 | 149 | 163 | 143 |
| Elongation (%) | 200 | 220 | 230 | 200 | 200 | 180 | 210 | 170 | 170 | 170 | 150 |
| Compression set (25.4 × 3.5 mm O-ring) | | | | | | | | | | | |
| 200° C. × 72 hours (%) | 20 | 20 | 32 | 23 | 22 | 25 | 19 | 29 | 49 | 29 | 38 |
| 200° C. × 240 hours (%) | — | 30 | — | — | — | — | — | 53 | — | — | — |

*Press-curing for 15 minutes

EXAMPLES 8 TO 10

In order to test the amount of Bisphenol AF, the same procedures as in Example 2 are repeated by employing the various amounts of Bisphenol AF shown in Table 3. The results are shown in Table 3.

TABLE 3

| | Ex. 8 | Ex. 9 | Ex. 10* |
|---|---|---|---|
| Component | | | |
| Viton E-60 | 100 | 100 | 100 |
| M.T. carbon black | 30 | 30 | 30 |
| Calcium hydroxide | 6 | 6 | 6 |
| Magnesium oxide | 3 | 3 | 3 |
| Bisphenol AF | 1.5 | 2.5 | 3.5 |
| Bis (benzyl diphenyl) iminum chloride | 0.45 | 0.45 | 0.45 |
| Rheometer (177° C.) | | | |
| Minimum viscosity (torque) | 3.0 | 2.0 | 2.2 |
| Cure rate (torque) | 34.2 | 49.3 | 54.9 |
| Scorch time (min.) | 3.4 | 8.4 | 14.2 |
| Proper curing time (min.) | 4.7 | 11.3 | 22.1 |
| Tensile Properties | | | |
| Shore hardness, JIS-A | 68 | 76 | 81 |
| Modulus at 100% elongn. (kgf/cm$^2$) | 40 | 66 | 110 |
| Tensile strength (kgf/cm$^2$) | 168 | 179 | 174 |
| Elongation (%) | 280 | 190 | 140 |
| Compression set (25.4 × 3.5 mm O-ring) 200° C. × 72 hours (%) | 25 | 18 | 16 |

*Press curing for 20 minutes

EXAMPLES 11 TO 15

These examples illustrate compositions containing the sulfone compound.

In Example 11, one part by weight of dimethyl sulfone is added to the composition of Example 2, and then the same procedure as in Example 2 is repeated, except that a press-cure of 5 minutes is used instead of 10 minutes.

In Example 12, the procedure of Example 11 is repeated by using 3.0 parts by weight of dimethyl sulfone instead of 1.0 parts of the sulfone.

In Example 13, the procedure of Example 11 is repeated by using 3.0 parts by weight of dibutyl-sulfone instead of 1.0 part of dimethyl sulfone.

In Example 14, the same procedure as in Example 11 is used except employing one part of Bis(4-fluorophenyl)sulfone and 7 minutes of press-curing time.

In Example 15, the same procedure as in Example 11 is used except employing 1.0 parts of Bis(4-chlorophenyl)sulfone and 8 minutes of press-curing time.

These results are shown in Table 4. As is clear from these examples, it is possible to shorten the time of press-curing without a reduction in the curing properties by further addition of the sulfone compound to the present composition.

TABLE 4

| | Ex. 11 | Ex. 12 | Ex. 13 | Ex. 14 | Ex. 15 | Ex. 2 |
|---|---|---|---|---|---|---|
| Composition | | | | | | |
| Viton E-60 | 100 | 100 | 100 | 100 | 100 | 100 |
| M.T. Carbon black | 30 | 30 | 30 | 30 | 30 | 30 |
| Calcium hydroxide | 6 | 6 | 6 | 6 | 6 | 6 |
| Magnesium oxide | 3 | 3 | 3 | 3 | 3 | 3 |
| Bisphenol AF | 2.0 | 2.0 | 2.0 | 2.0 | 2.0 | 2.0 |
| Bis(benzyldiphenylphosphine) iminum chloride | 0.45 | 0.45 | 0.45 | 0.45 | 0.45 | 0.45 |
| Dimethyl sulfone | 1.0 | 3.0 | | | | — |
| Dibutyl sulfone | | | 3.0 | | | |
| Bis(4-chlorophenyl)sulfone | | | | | 1.0 | — |
| Bis(4-fluorophenyl)sulfone | | | | 1.0 | | |
| Rheometer (177° C.) | | | | | | |

TABLE 4-continued

|  | Ex. 11 | Ex. 12 | Ex. 13 | Ex. 14 | Ex. 15 | Ex. 2 |
|---|---|---|---|---|---|---|
| Minimum viscosity (torque) | 2.5 | 2.8 | 2.1 | 2.4 | 2.3 | 2.4 |
| Cure rate (torque) | 41.1 | 45.6 | 46.0 | 44.6 | 43.7 | 43.5 |
| Scorch time (min.) | 3.8 | 2.2 | 2.8 | 5.1 | 5.5 | 5.9 |
| Proper curing time (min.) | 4.9 | 3.4 | 4.7 | 7.0 | 7.6 | 8.4 |
| Curing condition Press-curing at 177° C. (min.) | 5 | 5 | 5 | 7 | 8 | 10 |
| Oven-curing at 232° × 24 hours Tensile Properties | | | | | | |
| Shore hardness, JIS-A | 74 | 72 | 73 | 73 | 73 | 73 |
| Modulus at 100% elong. (kgf/cm²) | 61 | 60 | 52 | 55 | 52 | 53 |
| Tensile strength (kgf/cm²) | 184 | 170 | 180 | 180 | 178 | 169 |
| Elongation (%) | 230 | 210 | 230 | 230 | 220 | 220 |
| Compression set (25.4 × 3.5 mm O-ring) 200° C. × 72 hours (%) | 19 | 20 | 19 | 19 | 20 | 20 |

EXAMPLES 16 TO 18 AND COMPARATIVE EXAMPLES 5 TO 8

In these Examples, thermal aging tests are conducted in accordance with JIS K6301 on the condition of standing at 200° C. for 500 hours. Examples 16 to 18 and Comparative Examples 5 and 6 illustrate the thermal aging tests of the compositions of Examples 2, 11 and 3, Comparative Examples 1 and 2, respectively. In Comparative Example 7 the test is conducted employing the same composition as in Example 1 except 0.60 parts by weight of benzyltriphenylphosphonium chloride instead of 0.34 part by weight of Bis(methyldiphenylphosphine)iminum chloride. In Comparative Example 8, the composition employed is the same as that for Example 3 except that 0.60 parts by weight of Benzyltriphenylphosphonium chloride is used instead of Bis(benzyldiphenylphosphine)iminum chloride, and twenty minutes of press-curing is used instead of the 10 minutes in Example 3.

The results are shown in Table 5. As is clear from the data in Table 5, the present composition shows excellent thermal resistance as well as the known composition containing benzyltriphenylphosphonium chloride in comparison with the composition containing Bis(-triarylphosphine)iminum chloride. There is no influence in the thermal resistance in spite of the presence of the sulfone compound.

ples 2 and 11 are allowed to stand for an additional one week at 40° C. and 90% of humidity, and then the same procedures are used with Examples 2 and 11. The results are shown in Table 6 together with the results of Examples 2 and 11. There is no transition in the curing properties, and the present composition shows an excellent storage stability.

TABLE 6

|  | Ex. 19 | Ex. 2 | Ex. 20 | Ex. 11 |
|---|---|---|---|---|
| Composition | | | | |
| Viton E-60 | 100 | 100 | 100 | 100 |
| M.T. carbon black | 30 | 30 | 30 | 30 |
| Calcium hydroxide | 6 | 6 | 6 | 6 |
| Magnesium oxide | 3 | 3 | 3 | 3 |
| Bisphenol AF | 2.0 | 2.0 | 2.0 | 2.0 |
| Bis(benzyldiphenylphosphine)iminum chloride | 0.45 | 0.45 | 0.45 | 0.45 |
| Dimethyl sulfone | | | 1.0 | 1.0 |
| Rheometer (177° C.) | | | | |
| Minimum viscosity (torque) | 3.1 | 2.4 | 3.4 | 2.5 |
| Cure rate (torque) | 40.6 | 43.5 | 39.6 | 41.1 |
| Scorch time (min.) | 3.4 | 5.9 | 2.9 | 3.8 |
| Proper curing time (min.) | 5.7 | 8.4 | 4.0 | 4.9 |
| Curing condition Press-curing at 177° C. (min.) | 10 | 10 | 5 | 5 |
| Oven-curing at 232° C. × 24 hours | | | | |
| Tensile Properties | | | | |
| Shore hardness, JIS-A | 73 | 73 | 73 | 74 |
| Modulus at 100% elongn. (kgf/cm²) | 53 | 53 | 64 | 61 |
| Tensile strength (kgf/cm²) | 170 | 169 | 187 | 184 |
| Elongation (%) | 220 | 220 | 240 | 230 |
| Compression set (25.4 × | 19 | 20 | 19 | 19 |

TABLE 5

|  | Ex. 16 | Ex. 17 | Ex. 18 | Comp. Ex. 5 | Comp. Ex. 6 | Comp. Ex. 7 | Comp. Ex. 8 |
|---|---|---|---|---|---|---|---|
| Component | | | | | | | |
| Viton E-60 | 100 | 100 | | 100 | | 100 | |
| Viton B | | | 100 | | 100 | | 100 |
| M.T. carbon black | 30 | 30 | 30 | 30 | 30 | 30 | 30 |
| Calcium hydroxide | 6 | 6 | 6 | 6 | 6 | 6 | 6 |
| Magnesium oxide | 3 | 3 | 3 | 3 | 3 | 3 | 3 |
| Bisphenol AF | 2.0 | 2.0 | 2.0 | 2.0 | 2.0 | 2.0 | 2.0 |
| Bis(benzyldiphenylphosphine)iminum chloride | 0.45 | 0.45 | 0.90 | | | | |
| Bis(triphenylphosphine)iminum chloride | | | | 0.43 | 0.86 | | |
| Benzyltriphenylphisphonium chloride | | | | | | 0.60 | 0.60 |
| Dimethyl sulfone | | 1.0 | | | | | |
| Aging test (200° C. × 500 hrs.) | | | | | | | |
| Variation of hardness (JIS-A) | +1 | 0 | +1 | +1 | +5 | +2 | +1 |
| Variation of modulus at 100% | +15 | +11 | +19 | +21 | +45 | +16 | +2 |
| Variation of tensile strength | +2 | +3 | +1 | −28 | −5 | +5 | −6 |
| Variation of elongation | −2 | −8 | −18 | −28 | −31 | −16 | −10 |

EXAMPLES 19 AND 20

These examples illustrate the storage stability of the present compositions. The compositions obtained from the step concerning standing over one night in Exam-

TABLE 6-continued

|  | Ex. 19 | Ex. 2 | Ex. 20 | Ex. 11 |
|---|---|---|---|---|
| 3.5 mm O-ring) 200° C. × 72 hours (%) |  |  |  |  |

EXAMPLE 21 AND COMPARATIVE EXAMPLE 9

A mold releasing property is tested in these Examples. The same procedure as in Example 1 is repeated except that 0.15 parts by weight of Bis(benzyldiphenylphosphine)iminum chloride is used instead of 0.34 parts of Bis(methyldiphenylphosphine)iminum chloride and 60 minutes of press-curing is employed instead of 10 minutes (Example 21). In order to make a comparison, the procedure of Example 21 is repeated by using 0.11 parts by weight of the known benzyltriphenylphosphonium chloride instead of 0.15 parts of Bis(benzyldiphenylphosphine)iminum chloride. The results are shown in Table 7. The present composition is superior in the mold releasing property to the composition containing the known benzyltriphenylphosphonium chloride.

TABLE 7

|  | Ex. 21 | Comp. Ex. 9 |
|---|---|---|
| Composition |  |  |
| Viton E-60 | 100 | 100 |
| M.T. carbon black | 30 | 30 |
| Calcium hydroxide | 6 | 6 |
| Magnesium oxide | 3 | 3 |
| Bisphenol AF | 2.0 | 2.0 |
| Bis(benzyldiphenylphosphine) iminum chloride | 0.15 |  |
| Benzyltriphenylphosphonium chloride |  | 0.11 |
| Rheometer (177° C.) |  |  |
| Minimum viscosity (torque) | 2.6 | 2.6 |
| Cure rate (torque) | 47.4 | 43.9 |
| Scorch time (min.) | 33.0 | 24.5 |
| Proper curing time (min.) | 56.9 | 46.8 |
| Curing condition Press-curing at 177° C. (min.) Oven-curing 232° C. × 24 hrs. | 60 | 60 |
| Tensile properties |  |  |
| Shore hardness, JIS-A | 74 | 71 |
| Modulus at 100% elongn. (kgf/cm²) | 51 | 50 |
| Tensile strength (kgf/cm²) | 186 | 165 |
| Elongation (%) | 230 | 200 |
| Compression set (25.4 × 3.5 mm O-ring) 200° C. × 72 hours (%) | 17 | 17 |
| Processibility of O-ring (Press-curing at 177° C. × 60 min.) |  |  |
| Appearance rate of blister and blemish induced by the adhesion of the cured elastomer to the mold | 11 | 82 |

EXAMPLES 22 AND 23, AND COMPARATIVE EXAMPLES 10 AND 11

The similar procedures of Example 2 are repeated by using another fluoroelastomeric copolymer Tecnoflone NML and Tecnoflone NM (trade name of Montedison S.P.A.; a copolymer of vinylidene fluoride and hexafluoropropene and having a Mooney ML$_{1+4}$ (100° C.)=55 and 85, respectively). The amount of each component and curing conditions are shown in Table 8 together with their results.

TABLE 8

| Component | Ex. 22 | Ex. 23 | Comp. Ex. 10 | Comp. Ex. 11 |
|---|---|---|---|---|
| Tecnoflone NML | 100 |  | 100 |  |
| Tecnoflone NM |  | 100 |  | 100 |
| M.T. carbon black | 25 | 25 | 25 | 25 |
| Calcium hydroxide | 5 | 5 | 5 | 5 |
| Magnesium oxide | 5 | 5 | 5 | 5 |
| Bisphenol AF | 2.0 | 2.0 | 1.8 | 1.7 |
| Bis(benzyldiphenyl phosphine)iminum chloride | 0.45 | 0.45 |  |  |
| Bis(triphenylphosphine)iminum chloride |  | 0.60 |  |  |
| Bis(triphenylphosphine)iminum bromide |  |  |  | 0.65 |
| Rheometer (177° C.) |  |  |  |  |
| Minimum viscosity (torque) | 3.2 | 5.6 | 3.8 | 4.9 |
| Curing rate (torque) | 42.3 | 42.9 | 46.1 | 44.9 |
| Scorch time (min.) | 7.5 | 7.0 | 3.3 | 3.4 |
| Proper curing time (min.) | 13.3 | 11.3 | 5.8 | 6.1 |
| Curing condition Press-curing at 177° C. (min.) Oven curing 232° C. × 24 hrs. | 20 | 20 | 10 | 10 |
| Tensile properties |  |  |  |  |
| Shore hardness, JIS-A | 71 | 69 | 74 | 71 |
| Modulus at 100% elongn. (kgf/cm²) | 59 | 56 | 73 | 58 |
| Tensile strength (kgf/cm²) | 195 | 192 | 179 | 178 |
| Elongation (%) | 200 | 200 | 160 | 180 |
| Compression set (25.4 × 3.5 mm O-ring) 200° C. × 72 hours (%) | 21 | 20 | 31 | 32 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A curable fluoroelastomer composition comprising:
    (a) a fluoroelastomeric copolymer of vinylidene fluoride and at least one other fluorinated monomer,
    (b) as a curing accelerator, an iminum compound represented by the formula (1)

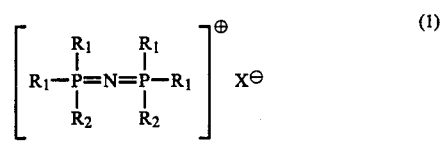

wherein $R_1$ is a phenyl group,
$R_2$ is a methyl group or a benzyl group,
X is chlorine;
    (c) a polyhydroxy compound as a cross-linking agent; and
    (d) a metal compound selected from a divalent metal hydroxide, a divalent metal oxide or a mixture thereof.

2. A curable fluoroelastomer composition according to claim 1, further comprising a sulfone compound, as a curing accelerator, represented by the formula:

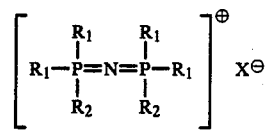 (1)

wherein $R_1$ is a phenyl group,
$R_2$ is a methyl group or a benzyl group,
X is chlorine;

(c) 0.1 to 10 parts by weight of a polyhydroxy compound as a cross-linking agent; and
(d) 1 to 30 parts by weight of a metal compound selected from a divalent metal hydroxide, a divalent metal oxide or a mixture thereof.

8. A curable fluoroelastomer composition according to claim 7, wherein $R_2$ is a benzyl group.

9. A curable fluoroelastomer composition according to claim 7, wherein said iminum compound is bis(benzyldiphenylphosphine)iminum chloride, said polyhydroxy compound is bisphenol AF or hydroquinone, and said metal compound is an oxide or hydroxide of magnesium, zinc, calcium or lead.

10. A curable fluoroelastomer composition according to claim 7, further comprising a sulfone compound as a curing accelerator, represented by the formula:

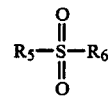 (2)

wherein $R_5$ and $R_6$, are the same or different, and are each a substituted or unsubstituted alkyl group having 1 to 20 carbon atoms, a substituted or unsubstituted cycloalkyl group having 3 to 20 carbon atoms, a substituted or unsubstituted cycloalkenyl group having 4 to 12 carbon atoms, a substituted or unsubstituted aralkyl group having 7 to 20 carbon atoms and a substituted or unsubstituted phenyl group.

11. A curable fluoroelastomer composition according to claim 9, further comprising 0.05 to 10 parts by weight of dimethylsulfone.

12. A curable fluoroelastomer composition according to claim 7, wherein $R_2$ is a methyl group.

13. A curable fluoroelastomer composition according to claim 1, wherein $R_2$ is a methyl group.

* * * * *

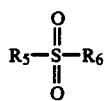 (2)

wherein $R_5$ and $R_6$, are the same or different, and are each a substituted or unsubstituted alkyl group having 1 to 20 carbon atoms, a substituted or unsubstituted cycloalkyl group having 3 to 20 carbon atoms, a substituted or unsubstituted cycloalkenyl group having 4 to 12 carbon atoms, a substituted or unsubstituted aralkyl group having 7 to 20 carbon atoms and a substituted or unsubstituted phenyl group.

3. A curable fluoroelastomer composition according to claim 2, wherein $R_5$ and $R_6$ are substituted or unsubstituted alkyl groups having 1 to 8 carbon atoms.

4. A curable fluoroelastomer composition according to claim 1, wherein said iminum compound is bis(benzyldiphenylphosphine)iminum chloride.

5. A curable fluoroelastomer composition according to claim 2, wherein said sulfone compound is dimethylsulfone.

6. A curable fluoroelastomer composition according to claim 1, wherein said polyhydroxy compound is bisphenol AF or hydroquinone.

7. A curable fluoroelastomer composition comprising:

(a) 100 parts by weight of a fluoroelastomeric copolymer of vinylidene fluoride and at least one other fluorinated monomer, (b) 0.05 to 2.0 parts by weight of a curing accelerator comprising an iminum compound represented by the formula (1)